United States Patent Office 3,341,448
Patented Sept. 12, 1967

3,341,448
DESULPHURIZATION OF HYDROCARBONS USING OXIDATIVE AND HYDRO-TREATMENTS
John Frederick Ford, Timothy Arrowsmith Rayne, and Dennis George Adlington, Sunbury-on-Thames, Middlesex, England, assignors to The British Petroleum Company Limited, London, England, a British joint-stock company
No Drawing. Filed Nov. 9, 1962, Ser. No. 236,688
Claims priority, application Great Britain, Nov. 24, 1961, 42,093/61
7 Claims. (Cl. 208—211)

This invention relates to the desulphurization of hydrocarbon materials, for example those of petroleum origin, and in particular petroleum fractions of high molecular weight.

In general the presence of sulphur or sulphur-containing compounds is highly undesirable in petroleum crude oils, distillates and residues. Many of the valuable properties of these materials are seriously impaired by the presence of sulphur compounds which results in a downgrading of their commercial value.

In the past, numerous processes have been employed either to eliminate undesirable sulphur compounds or to convert them into more innocuous forms. One type of process involves physical extraction with a liquid solvent such as sulphuric acid, sulphur dioxide, furfural and the like. Another type of process removes the sulphur compounds by adsorption on suitable materials, for example activated bauxite activated charcoal or an activated clay. A further type of process converts objectionable forms of sulphur compounds, such as mercaptans, into less harmful forms, such as disulphides and polysulphides by various chemical treatments, for example plumbite treatments, hypochlorite treatments and copper chloride treatments. The above processes are particularly used for the treatment of gasoline fractions. With feedstocks of high molecular weight, a large proportion of the material is in the form of molecules containing at least one sulphur atom, and, particularly in selective separation processes, this would be removed with consequent low product yield.

Yet another type of process which has been found particularly useful for the treatment of middle distillate fractions such as gas oil is hydrocatalytic desulphurization which comprises passing the material, generally with hydrogen under pressure, over a suitable catalyst at elevated temperature in order to eliminate sulphur atoms from the sulphur-containing compounds in the form of hydrogen sulphide. It is the object of this type of process to sever the carbon-sulphur linkages in the sulphur-containing compounds, eliminating the sulphur in the form of hydrogen sulphide while at the same time hydrogenating the hydrocarbon fragments left as a result of the desulphurization reaction. It has been found, however, that in order to effect appreciable reductions in the sulphur content of high molecular weight material, for example residual fuel oils, the conditions required for such hydrogen treatments are severe, and the catalyst life is shortened by deposit formation. Suitable hydrocatalytic desulphurization processes include both the normal hydrofining process which consumes hydrogen and the "Autofining" process in which there is no net consumption of hydrogen.

It has also been proposed in co-pending U.S. application, Ser. No. 154,932, filed Nov. 21, 1961, by Wilfred S. Nathan and John F. Ford for Desulphurization of Hydrocarbon Materials to subject a sulphur-containing hydrocarbon material to an oxidative desulphurization process carried out in two steps by submitting the hydrocarbon material to a selective oxidation reaction in which the sulphur-containing compounds are selectively attacked and then subjecting the oxidized material to a thermal decomposition step in which the sulphur is eliminated as a sulphurous gas.

According to the present invention a process for the desulphurization of sulphur-containing hydrocarbon materials comprises submitting the hydrocarbon material successively to an oxidation desulphurization stage carried out in two steps as aforesaid and a hydrodesulphurization stage in either this or the reverse order.

The process of the present invention is particularly suitable for desulphurizing petroleum fractions containing at least a proportion of material boiling above 250° C., for example crude oil and atmospheric and vacuum residues, which may contain 1% weight or more of sulphur.

A number of oxidizing agents may be employed in the first or oxidative step of the oxidative desulphurization stage, for example organic and inorganic peroxides, hydroperoxides, organic and inorganic peracids, chlorine, oxides of nitrogen, ozone and preferably, on account of their cheapness, molecular oxygen or air. In addition, the molecular oxygen or air may be promoted with suitable materials, for example metals from Group 5A and Group 8 of the Periodic Table or their salts or oxides, particularly platinum, palladium, nickel and vanadium. These promoters may be supported on a suitable material, for example alumina, soda-lime or active carbon. Where the supporting material has acidic, and therefore cracking, properties as in the case of alumina, these may be modified by treatment with an alkali metal, particularly sodium, or an ammonium compound. The use of such promoters improves the selective oxidation and also increases the rate of reaction, allowing the selective oxidation step to be completed in a shorter time or, alternatively, at a lower temperature, The preferred conditions required for the selective oxidation step depend both on the material being treated as well as on the oxidizing agent being employed but generally a temperature within the range 80 to 180° C. is employed with a quantity of oxidizing agent corresponding to between 1 and 6 active oxygen atoms per atom of sulphur in the feedstock for a period of between ½ and 20 hours. When using molecular oxygen or air as oxidizing agent suitable temperatures lie within the range 130 to 180° C. for periods of between 2 and 20 hours.

In the second or thermal decomposition step of the oxidative desulphurization stage the oxidized sulphur compounds are eliminated, preferably by means of a thermal decomposition carried out at temperatures above 200° C., preferably above 250° C. and particularly in the range 300 to 400° C. for a period sufficient to ensure that substantially all the gaseous decomposition products are given off. This period may be within the range ½ to 5 hours, preferably between ½ and 2 hours. Under these conditions, the oxidized sulphur compounds are decomposed and the sulphur is liberated mainly as $SO_2$ although at higher temperatures in the region of 300° C. and over, increasing quantities of $H_2S$ are also liberated. The thermal decomposition step may be carried out in the presence of suitable promoting materials comprising porous solids having acidic or basic properties for example, ferric oxide on alumina, bauxite, thoria on pumice, silica alumina, soda-lime and acid sodium phosphate on carbon. Preferably, in the thermal decomposition step, a small quantity of an inert carrier gas, for example nitrogen, is passed through the reaction mixture to avoid local overheating and also to remove the gaseous decomposition products.

The catalytic hydrodesulphurization stage may be carried out under relatively mild conditions in a fixed, moving, fluidized or ebullating bed of catalyst. Preferably a fixed bed of catalyst is used under conditions such that relatively long periods elapse before regeneration becomes necessary, for example a temperature within the range 500–900° F. preferably 650–800° F., a pressure within the range 100–2500 p.s.i.g., preferably 500–1500 p.s.i.g., a space velocity within the range 0.1–10 v./v./hr. preferably 0.5–4 v./v./hr. and a hydrogen recycle rate of 500–5000 s.c.f./b. Suitable catalysts comprise one or more Group 6A or Group 8 metals or their oxides or sulphides on a refractory oxide support, for example alumina. A particularly preferred catalyst comprises a mixture of cobalt and molybdenum on alumina containing 1–10% weight cobalt oxide (expressed as CoO) and 5–40% weight molybdenum oxide (expressed as $MoO_3$).

It has been found that when a feedstock is subjected successively to an oxidative desulphurization stage and a hydrodesulphurization stage, the degree of desulphurization achieved is significantly higher than that achieved by either two successive oxidative desulphurization stages or two successive hydrodesulphurization stages. This improvement is, moreover, independent of the order in which the stages are carried out. It appears, therefore, that the sulphur compounds most readily attacked under oxidative and hydrocatalytic conditions respectively are different and that by using both processes a synergistic effect is achieved. It is naturally desirable that, when the oxidative stage is carried out first, all free oxygen is removed from the hydrocarbons before the hydrocatalytic stage. This will, in fact, be done during the thermal decomposition step of the oxidative stage. Similarly, when the hydrocatalytic stage is carried out first, any free hydrogen should be removed before the oxidative stage.

The invention is illustrated by means of the following comparative example in which a Kuwait atmospheric residue containing 4% weight sulphur was subjected firstly to oxidative desulphurization followed by hydrodesulphurization, secondly to hydrodesulphurization followed by oxidative desulphurization, thirdly to two successive oxidative desulphurization stages and lastly to two successive hydrodesulphurization stages.

The conditions employed in each oxidative desulphurization stage were as indicated in the following Table 1.

*Table 1*

Oxidation:
- Residue _____ 2 pts. by wt.
- Toluene _____ Do.
- Glacial acetic acid ___ 1 pt. by wt.
- Hydrogen peroxide 30% w./v.[1] _____ Quantity corresponding to 6 active oxygen atoms per atom of sulphur.
- Temperature _____ 98° C.
- Time of reaction _____ 25 minutes.
- Time of stripping _____ Do.

Thermal treatment:
- Temperature _____ 370° C.
- Time _____ 1 hour.
- Catalyst _____ Silica - alumina (8% by wt.).

[1] Mixed acetic acid and hydrogen peroxide added to toluene residue mixture.

The conditions employed in each hydrodesulphurization stage were as indicated in the following Table 2.

*Table 2*

- Catalyst _____ Cobalt 2.0% wt., molybdenum 10.5% wt. on γ-alumina.
- Temperature _____ 730° F. (393° C.).
- Pressure _____ 1,000 p.s.i.g.
- Space velocity _____ 1.0–1.5 v./v./hr.
- $H_2$ rate _____ 1,000 s.c.f./b.

The results are indicated in the following Tables 3–6.

*Table 3*

| Treatment | Sulphur | | |
|---|---|---|---|
| | Parts remaining/ 100 of oil | Parts removed/ 100 of oil | Fraction percent removed based on untreated feedstock |
| Untreated | 4.0 | | |
| Oxidatively desulphurized only | 2.8 | 1.2 | 30 |
| Oxidatively desulphurized and hydrodesulphurized | 1.6 | 1.2 | 30 |
| Total | | 2.4 | 60 |

*Table 4*

| Treatment | Sulphur | | |
|---|---|---|---|
| | Parts remaining/ 100 of oil | Parts removed/ 100 of oil | Fraction percent removed based on untreated feedstock |
| Untreated | 4.0 | | |
| Hydrodesulphurized only | 2.8 | 1.2 | 30 |
| Hydrodesulphurized and oxidatively desulphurized | 1.6 | 1.2 | 30 |
| Total | | 2.4 | 60 |

*Table 5*

| Treatment | Sulphur | | |
|---|---|---|---|
| | Parts remaining/ 100 of oil | Parts removed/ 100 of oil | Fraction percent removed based on untreated feedstock |
| Untreated | 4.0 | | |
| 1st oxidative desulphurization | 2.9 | 1.1 | 27 |
| 2d oxidative desulphurization | 2.4 | 0.5 | 13 |
| Total | | 1.6 | 40 |

*Table 6*

| Treatment | Sulphur | | |
|---|---|---|---|
| | Parts remaining/ 100 of oil | Parts removed/ 100 of oil | Fraction percent removed based on untreated feedstock |
| Untreated | 4.0 | | |
| 1st Hydrodesulphurization | 2.8 | 1.2 | 30 |
| 2d Hydrodesulphurization | 2.2 | 0.6 | 15 |
| Total | | 1.8 | 45 |

We claim:
1. A process for the desulphurization of a petroleum fraction containing at least a proportion of material boiling above 250° C. and having at least 1% weight of sulphur, the sulphur being present in said fraction in the form of sulphur-containing compounds of high molecular weight, said process comprising: treating said fraction in separate and successive stages, one stage comprising a two-step oxidative and thermal desulphurization stage and the other stage comprising a hydrocatalytic desulphurization stage; said two-step oxidative and thermal desulphurization stage comprising contacting the fraction with an oxidizing agent at a temperature within the range 80° C.–180° C. using an amount of oxidizing agent corresponding to between 1 and 6 active oxygen atoms per atom of sulphur in the fraction, and for a period of time of ½ to 20 hours, to selectively oxidize the sulphur-containing compounds of high molecular weight, subjecting the oxidized product to a thermal decomposition treatment at a temperature in the range about 200° C.–400° C. for a period of time sufficient to decompose the oxidized sulphur compound and liberate the sulphur as a sulphurous gas, and removing the gaseous decomposition products from the product of said thermal decomposition treatment; and said hydrocatalytic desulphurization stage comprising contacting the fraction with a desulphurization catalyst in the presence of hydrogen at a temperature within the range 500° F.–900° F. and a pressure within the range 100 to 2500 p.s.i.g.

2. A process in accordance with claim 1 wherein the oxidizing agent employed is air and the temperature during the oxidizing stage is in the range 130–180° C.

3. A process as claimed in claim 2, wherein the air is promoted with a substance selected from the group consisting of Group 5A and Group 8 metals, metal salts and oxides, on a support.

4. A process as claimed in claim 1 wherein the oxidative treatment stage precedes the hydrocatalytic treatment stage.

5. A process as claimed in claim 1 wherein the hydrocatalytic treatment stage precedes the oxidative treatment stage.

6. A process as claimed in claim 1 wherein the oxidizing agent employed during the oxidative stage is molecular oxygen.

7. A process as claimed in claim 1 wherein the hydrocatalytic treatment stage is operated using a fixed bed of catalyst comprising a substance selected from the group consisting of Group 6A and Group 8 metals, metal oxides and metal sulphides on a refractory oxide support.

References Cited
UNITED STATES PATENTS

| | | | |
|---|---|---|---|
| 2,955,123 | 10/1960 | Favis | 208—254 |
| 3,105,812 | 10/1963 | Flinn et al. | 208—254 |
| 3,163,593 | 12/1964 | Webster et al. | 208—240 |

DELBERT E. GANTZ, *Primary Examiner.*

ALPHONSO D. SULLIVAN, S. P. JONES,
*Assistant Examiners.*